(12) United States Patent
Moore et al.

(10) Patent No.: US 12,299,469 B2
(45) Date of Patent: May 13, 2025

(54) SYMBOL MAPPING SYSTEM FOR CONCURRENT KERNEL AND USER SPACE DEBUGGING OF A VIRTUAL MACHINE

(71) Applicant: Nightwing Group, LLC, Dulles, VA (US)

(72) Inventors: Justin Moore, Austin, TX (US); Michael Swan, San Antonio, TX (US); Gregory Price, Silver Spring, MD (US)

(73) Assignee: NIGHTWING GROUP, LLC, New York, NY (US)

( * ) Notice: Subject to any disclaimer, the term of this patent is extended or adjusted under 35 U.S.C. 154(b) by 766 days.

(21) Appl. No.: 17/361,741

(22) Filed: Jun. 29, 2021

(65) Prior Publication Data

US 2022/0050704 A1 Feb. 17, 2022

Related U.S. Application Data

(60) Provisional application No. 63/065,222, filed on Aug. 13, 2020.

(51) Int. Cl.
| | |
|---|---|
| G06F 9/455 | (2018.01) |
| G06F 9/46 | (2006.01) |
| G06F 11/362 | (2025.01) |
| G06F 16/24 | (2019.01) |
| G06F 16/25 | (2019.01) |

(52) U.S. Cl.
CPC ........ *G06F 9/45558* (2013.01); *G06F 9/461* (2013.01); *G06F 11/362* (2013.01); *G06F 16/24* (2019.01); *G06F 16/25* (2019.01); *G06F 2009/45591* (2013.01)

(58) Field of Classification Search
None
See application file for complete search history.

(56) References Cited

U.S. PATENT DOCUMENTS

| | | | |
|---|---|---|---|
| 10,740,217 B1 * | 8/2020 | Stupachenko | G06F 9/45558 |
| 2009/0044274 A1 * | 2/2009 | Budko | G06F 9/45558 718/1 |

\* cited by examiner

*Primary Examiner* — Eric C Wai
(74) *Attorney, Agent, or Firm* — Cowan, Liebowitz & Latman, P.C.; Mark Montague

(57) ABSTRACT

A method is provided comprising: monitoring, by a symbol context manager, context switch events that are generated in a virtual machine, and updating a symbol space map based on the context switch events; receiving, by the symbol context manager, a request to provide a symbol space of the virtual machine, the request being generated by a symbol database interface in response to a symbol query that is received at the symbol database interface from a debugger that is debugging the virtual machine, the symbol query being associated with a symbol that is part of the symbol space; and providing, by the symbol context manager, an indication of the symbol space of the virtual machine, the indication of the symbol space being provided based on the symbol space map.

17 Claims, 13 Drawing Sheets

| 147 | |
|---|---|
| SYMBOL_SPACE_1 148A | DATABASE_PORTION_C 148B —148 |
| SYMBOL_SPACE_2 148A | DATABASE_PORTION_A 148B —148 |
| SYMBOL_SPACE_3 148A | DATABASE_PORTION_B 148B —148 |

FIG. 1D

| | SYMBOL | MEMORY ADDRESS |
|---|---|---|
| 246 | SYMBOL_1 | MEM_ADDR_1 |
| 246 | SYMBOL_2 | MEM_ADDR_2 |
| 246 | SYMBOL_3 | MEM_ADDR_3 |
| 246 | SYMBOL_N | MEM_ADDR_N |

244

SYMBOL DB MODULES	SYMBOL OBJ. MODULES

SYMBOL MAPPING SYSTEM FOR CONCURRENT KERNEL AND USER SPACE DEBUGGING OF A VIRTUAL MACHINE

RELATED APPLICATIONS

This application claims the benefit of U.S. Provisional Application No. 63/065,222, filed Aug. 13, 2020, and entitled "Symbol Mapping System for Concurrent Kernel and User Space Debugging of A Virtual Machine," which is incorporated herein by reference in its entirety.

BACKGROUND

Program replay/record is an effective technique for debugging of software. When program record/replay is used, a live execution of the computer program is recorded to produce a trace log identifying one or more branches that were taken during the live execution. The live execution of the program then is repeated in what is herein referred to as "replay execution," by using the same set of events and/or inputs were used as a basis for the live execution. As a result of the replay execution, a second trace log is generated, which is herein referred to as "replay execution trace log." The replay execution trace log may be used to identify defects in the software that is being debugged.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the disclosure.

According to aspects of the disclosure, a method is provided comprising: monitoring, by a symbol context manager, context switch events that are generated in a virtual machine, and updating a symbol space map based on the context switch events; receiving, by the symbol context manager, a request to provide a symbol space of the virtual machine, the request being generated by a symbol database interface in response to a symbol query that is received at the symbol database interface from a debugger that is debugging the virtual machine, the symbol query being associated with a symbol that is part of the symbol space; and providing, by the symbol context manager, an indication of the symbol space of the virtual machine, the indication of the symbol space being provided based on the symbol space map.

According to aspects of the disclosure, a system is provided, comprising: a memory; and at least one processor operatively coupled to the memory, the at least one processor being configured to perform the operations of: monitoring, by a symbol context manager, context switch events that are generated in a virtual machine, and updating a symbol space map based on the context switch events; receiving, by the symbol context manager, a request to provide a symbol space of the virtual machine, the request being generated by a symbol database interface in response to a symbol query that is received at the symbol database interface from a debugger that is debugging the virtual machine, the symbol query being associated with a symbol that is part of the symbol space; providing, by the symbol context manager, an indication of the symbol space of the virtual machine, the indication of the symbol space being provided based on the symbol space map.

According to aspects of the disclosure, a non-transitory computer-readable medium storing one or more processor-executable instructions, which when executed by at least one or processor cause the processor to perform the operations of: monitoring, by a symbol context manager, context switch events that are generated in a virtual machine, and updating a symbol space map based on the context switch events; receiving, by the symbol context manager, a request to provide a symbol space of the virtual machine, the request being generated by a symbol database interface in response to a symbol query that is received at the symbol database interface from a debugger that is debugging the virtual machine, the symbol query being associated with a symbol that is part of the symbol space; providing, by the symbol context manager, an indication of the symbol space of the virtual machine, the indication of the current symbol space being provided based on the symbol space map.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1D is a diagram of an example of a symbol space map, according to aspects of the disclosure;

DETAILED DESCRIPTION

In one aspect of the disclosure, techniques are provided for saving the and restoring the symbol context of a virtual machine. The techniques can be used to augment existing methods for program record and replay. In another aspect of the disclosure, techniques are provided for identifying the symbol space of a virtual machine. The techniques may be used to allow a debugger to resolve symbols defined in the symbol space of a virtual machine, irrespective of whether that machine is executing in kernel space, user space, or within a particular user or kernel space context.

Figure 1A:
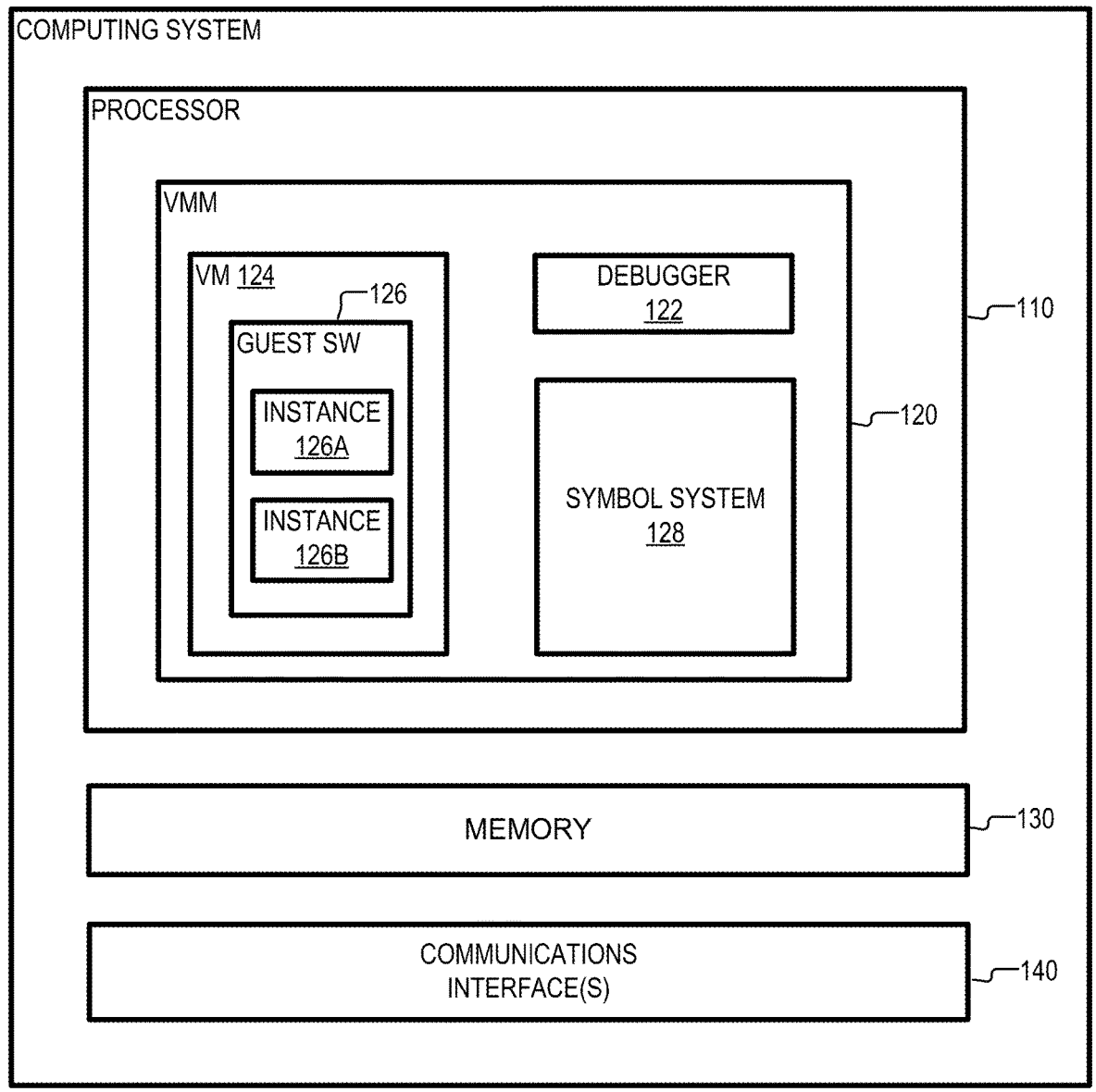
FIG. 1A is a diagram of an example of a computing system, according to aspects of the disclosure.

FIG. 1A is a schematic diagram of a computing system 100, according to aspects of the disclosure. As illustrated, the computing system 100 may include a processor 110 that is operatively coupled to a memory 130, and communications interface(s) 140. The processor 110 may include any suitable type of processing circuitry, such as one or more of an integrated circuit (ASIC), a field-programmable gate array (FPGA), and/or a general-purpose processor (e.g., an ARM-based processor, etc.). The memory 130 may include any suitable type of volatile and/or non-volatile memory. For example, in some implementations, the memory 130 may include one or more of random-access memory (RAM), a read-only memory (ROM), a solid-state drive (SSD), electrically erasable programmable read-only memory (EEPROM), and/or any other suitable type of memory. The communications interface(s) 140 may include a Bluetooth interface, a Wi-Fi interface, a ZigBee interface, a Universal Serial Bus (USB) interface, and/or any other suitable type of interface.

The processor 110 may be configured to execute a virtual machine manager (VMM) 120. The VMM 120 may include any suitable type of hypervisor. The VMM 120 may be configured to execute a debugger 122, a virtual machine (VM) 124, and a symbol system 128. The VM 124 may include any suitable type of virtual machine. The VM 124 may be configured to execute a first instance 126A and a second instance 126B of a guest software 126. The debugger 122 may include any suitable type of debugger that is configured to debug the operation of VM 124. Debugging the operation of VM 124 may include debugging VM 124 itself and/or debugging any process and/or application that is executed within VM 124. The symbol system 128 may include one or more processes that are arranged to manage various symbol spaces within VMM 120, and resolve symbol queries that are submitted by the debugger 122, the VM 124, and/or other software that is executed on the processor 110. A symbol query may include any query that includes a symbol. Resolving the symbol query may include identifying a memory address that is associated with the symbol, and providing the memory address to a submitter of the symbol query. As used throughout the disclosure, the term "symbol" may refer to any alphanumerical string (or a character or number, etc.) that is mapped, by the symbol system 128, to a memory location in the computing system 100.

Figure 1C:
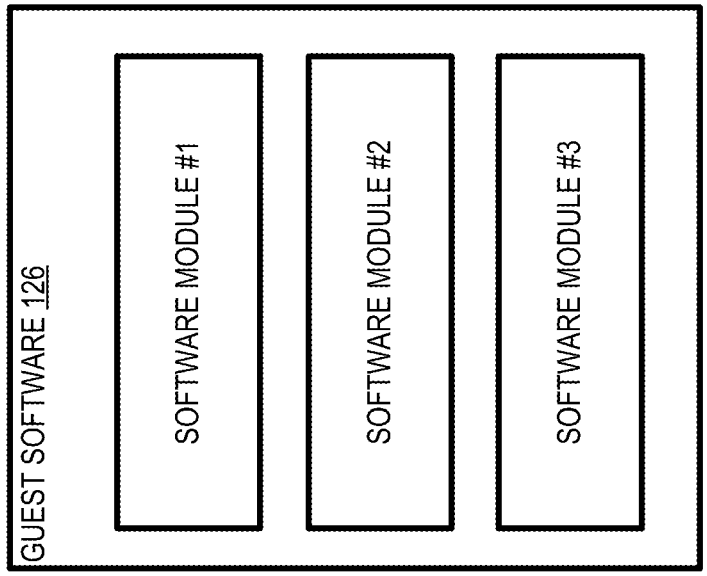
FIG. 1C is a diagram of an example of a guest software, according to aspects of the disclosure.
Figure 1B:
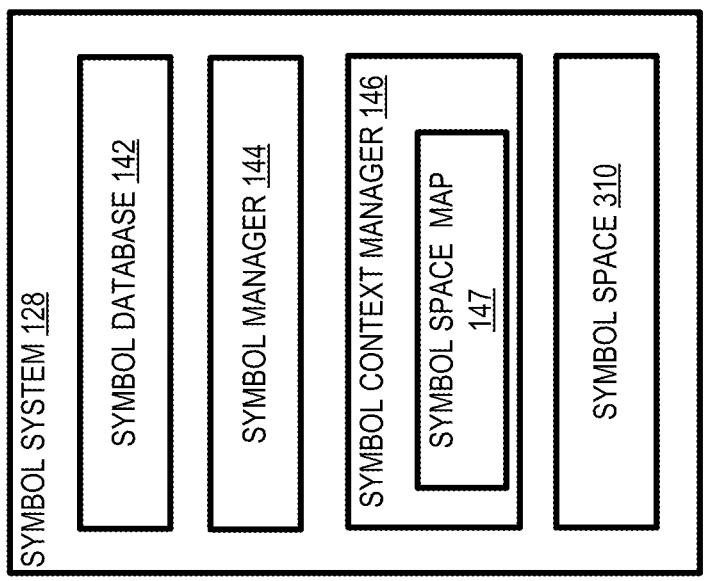
FIG. 1B is diagram of an example of a symbol system, according to aspects of the disclosure.

FIG. 1B is a diagram of the symbol system 128, according to aspects of the disclosure. As illustrated, the symbol system 128 may include a symbol database, a symbol manager 144, a symbol context manager 146, and a symbol space 310. The symbol database 142 may include one or more objects that are instantiated at run-time (e.g., at runtime of VM 124 and/or software instances 126A-B), and which map symbols to corresponding memory locations. The symbol manager 144 may include an interface to the symbol database 142. The symbol context manager 146 may include one or more processes that are configured to: (i) keep a record of a current symbol space of VM 124, (ii) save the current symbol context of VM 124, and (iii) revert VM 124 to a previous symbol context. The symbol context manager 146 may be configured to maintain and update a symbol space map 147. As illustrated in FIG. 1D, the symbol space map 147 may include a plurality of entries 148. Each entry 148 may include a first identifier 148A of a symbol space and a second identifier 148B of a portion of the symbol database 142, where the symbol space (identified by identifier 148A) is stored. According to the present example, the symbol space map 147 indicates that: symbol space #1 is stored in portion "C" of symbol database 142; symbol space #2 is stored in portion "A" of symbol database 142; and symbol space #3 is stored in portion "B" of symbol database 142. Although the symbol space map 147 is depicted is a monolithic entity, it will be understood that the present disclosure is not limited to any specific implementation of the symbol map. In this regard, it will be understood that the symbol space map 147 may include any set of one or more objects (or variables, etc.) that identify the respective portion of the symbol database 142 where a given symbol space is stored. Although not shown, in some implementations, the symbol space map 147 may include an indication of which one of the symbol spaces (identified by identifiers 148A) is the current symbol space of VM 124. Specific examples of symbol spaces are provided further below in the discussion with respect to FIGS. 3A-4B.

FIG. 1C is a diagram of the guest software 126, according to aspects of the disclosure. As illustrated, the guest software 126 may include three software modules, which are herein referred to as "software module #1", "software module #2", and "software module #3".

Figures 2A, 2B:
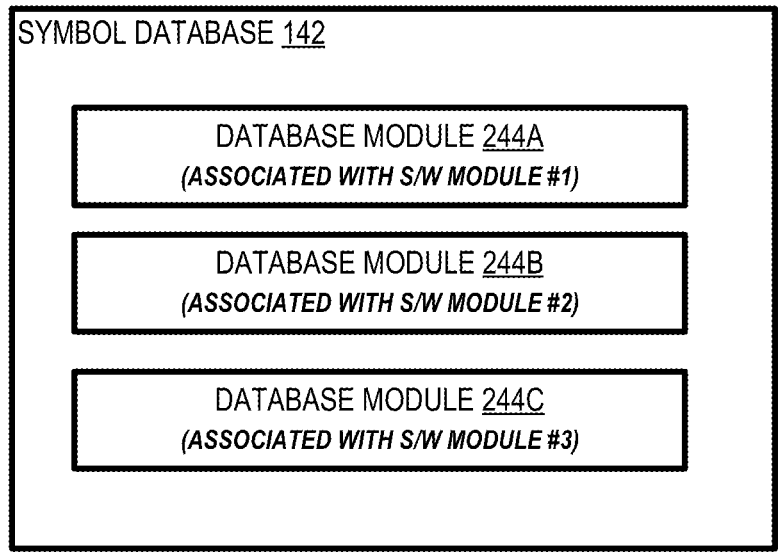
FIG. 2A is a diagram of an example of a symbol database, according to aspects of the disclosure.
FIG. 2B is a diagram is a diagram of an example of a symbol database module, according to aspects of the disclosure.

FIG. 2A shows the symbol database 142 in further detail. As illustrated, the symbol database 142 may include a plurality of symbol database modules 244. Each of the symbol database modules 244 may be instantiated at a different time instant. For example, symbol database module 244A may be instantiated at time T1, symbol database module 244B may be instantiated at time T2, and symbol database module 244C may be instantiated at time T3. Each of the symbol database module 244A may be associated with a different software module of the guest software 126. For example, symbol database module 244A may be associated with software module #1; symbol database module 244B may be associated with software module #2; and symbol database module 244C may be associated with software module #3. By way of example, a symbol database module 244 may be associated with a software module when the symbol database module 244 maps symbols associated with the software module to corresponding memory locations. In some implementations, the symbols may be defined in the software module binary itself, defined in its source code, or have been produced by some external method and assigned the association by the debugger. In other words, as noted above, the symbols may be defined as an association between alphanumeric strings and the layout of a software module, irrespective of the source of such an association.

FIG. 2B is a diagram of an example of a symbol database module 244, according to aspects of the disclosure. As the numbering suggests, the symbol database module 244 may be the same or similar to any of the symbol database modules 244A-C, that are discussed above with respect to FIG. 2A. As illustrated, the symbol database module 244 may include a plurality of symbol definitions 246. Each of the symbol definitions 246 may include a symbol and an indication of a memory address that corresponds to the symbol, effectively providing a mapping between the symbol and the memory address. In other words, FIG. 2B illustrates an example of one type of content that might be part of any of the symbol database modules 244.

Figure 3A:
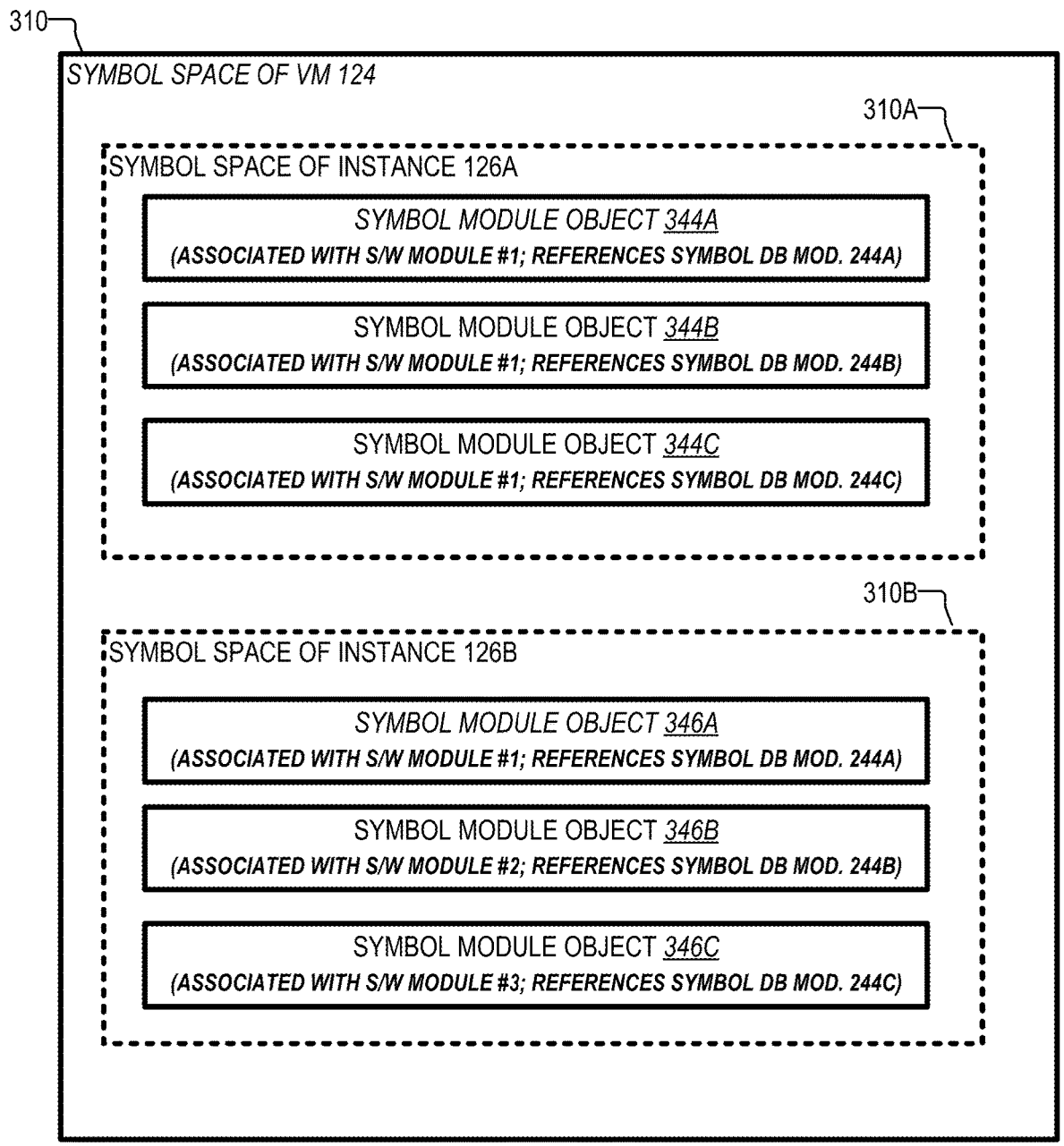
FIG. 3A is a diagram of an example of symbol address spaces of a virtual machine, according to aspects of the disclosure.

FIG. 3A is a diagram of an example of the symbol space 310, according to aspects of the disclosure. The symbol space 310 may include a symbol space 310A and a symbol space 310B. Symbol space 310A may be a symbol space of the first instance 126A of the guest software 126. Symbol space 310A may be allocated when the first instance 126A of guest software 126 is first executed, and it may be expanded as the execution of the first instance 126A progresses. Symbol space 310B may be a symbol space of the second instance 126B of the guest software 126. Symbol space 310B may be allocated when the second instance 126B of guest software 126 is executed, and it may be expanded as the execution of the second instance 126B progresses.

Symbol space 310A may include symbol module objects 344A-C. Symbol module object 344A may be associated with software module #1, and it may reference the symbol database module 244A. Symbol module object 344B may be associated with software module #2, and it may reference the symbol database module 244B. Symbol module object 344C may be associated with software module #3, and it may reference the symbol database module 244C. Symbol space 310B may include symbol module objects 346A-C. Symbol module object 346A may be associated with software module #1, and it may reference the symbol database module 244A. Symbol module object 346B may be associated with software module #2, and it may reference the symbol database module 244B. Symbol module object 346C may be associated with software module #3, and it may reference the symbol database module 244C. In some implementations, each of symbol module objects 344 and 346 may be provided by the symbol database 142 in response to a request that is received by the symbol database 142 when the symbol module object's corresponding software module instance is being created.

Figure 3B:
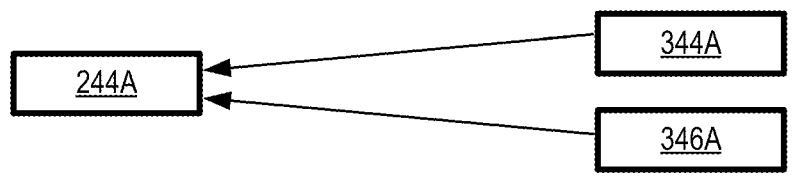
FIG. 3B is a diagram showing the relationship between symbol database modules and symbol object modules, according to aspects of the disclosure.
Figure 3B:
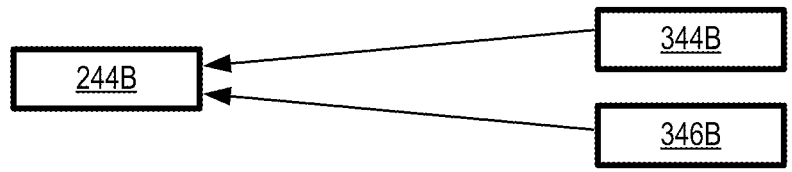
Figure 3B:
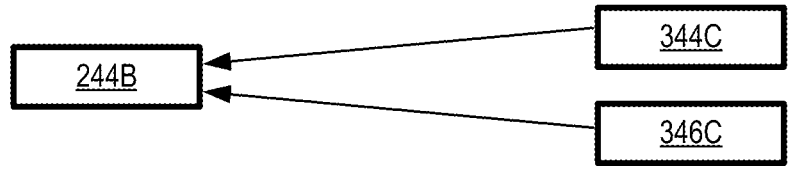

FIG. 3B is a diagram illustrating in further detail the relationship between symbol database modules and symbol module objects. According to the example of FIG. 3B, each of symbol module objects 344 and 346 includes a pointer (or another identifier) that references a corresponding symbol database module 244. Each of symbol module objects 344 and 346 may serve as a vehicle for indexing into its corresponding symbol database module 244. This arrangement permits multiple instances of the same software to share the same symbol database module, and is advantageous because it helps reduce memory consumption. According to the example of FIG. 3B, symbol module objects 344A and 346A are configured to reference the symbol database module 244A; symbol module objects 344B and 346B are configured to reference the symbol database module 244B; and symbol module objects 344C and 346C are configured to reference the symbol database module 244C.

Consider an example in which each of the first instance 126A of guest software 126 and the second instance 126B of guest software 126 wants to resolve symbol "pageswap." In this example, the first instance 126A of guest software 126 may use one of symbol module objects 344A-C to identify the symbol database module 244 that contains a mapping between "pageswap" and its corresponding memory location, after which the first instance of guest software may retrieve the corresponding memory location from the identified symbol database module 244. Similarly, the second instance 126B of guest software 126 may use one of symbol module objects 346A-C to identify the symbol database module 244 that contains a mapping between "pageswap" and its corresponding memory location, after which the first instance of guest software may retrieve the corresponding memory location from the identified symbol database module 244. In other words, the symbol module objects 344A-C and 346B-C may be used to reference the symbol database modules 244A-C and retrieve data from the symbol database modules 244A-C.

Figure 3C:
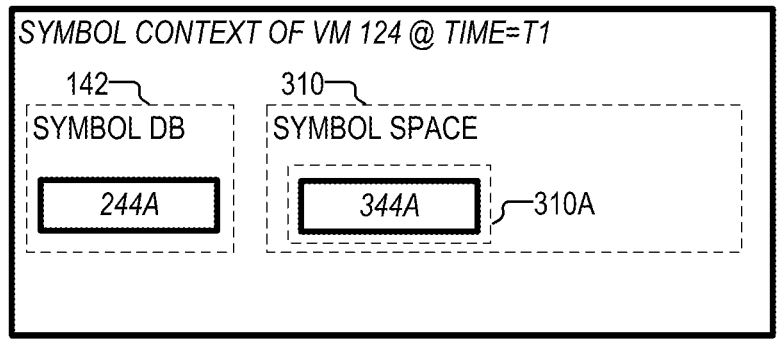
FIG. 3C is a diagram showing changes in the symbol context of a virtual machine, according to aspects of the disclosure.
Figure 3C:
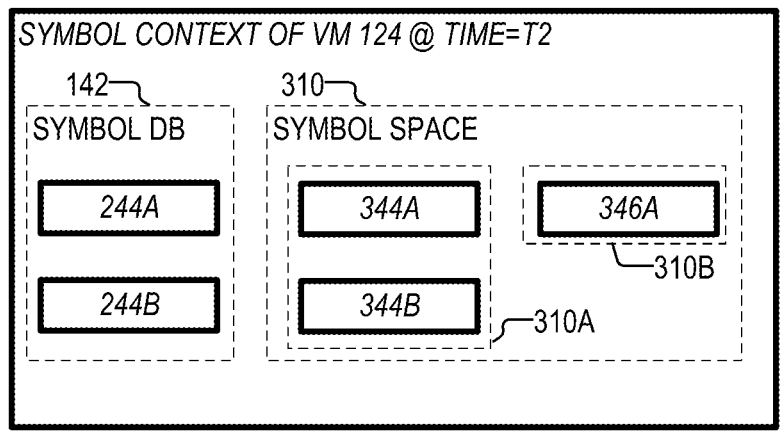
Figure 3C:
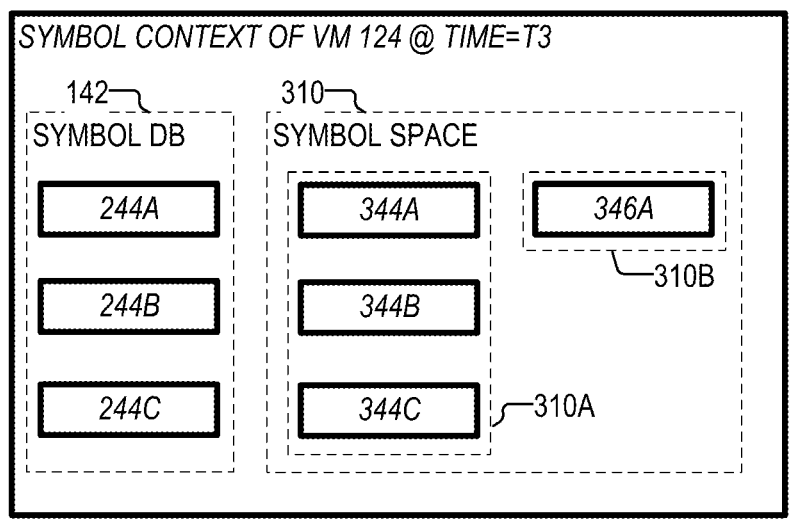

FIG. 3C is a diagram that shows an example of a symbol context of VM 124. FIG. 3C provides an example of what information may be part of the symbol context of VM 124. According to the example of FIG. 3C, the symbol context of VM 124 at a given time instant includes, the contents of the symbol database 142 and the symbol space 310. FIG. 3C illustrates the symbol context of VM 124 at times T1, T2, T3, and it illustrates how the symbol context of VM 124 may change over time.

At time T1, software module #1 of the first instance 126A of guest software 124 has been loaded, identified, or executed, software modules #2-3 of the first instance 126A of guest software 126 have not been loaded, identified, or executed yet, and the second instance 126B of guest software 126 has not been loaded, identified, or executed yet.

At time T1, the symbol context of VM 124 includes symbol database module 244A and symbol module object 344A. Saving the symbol context of VM 124 at time T1 may entail saving, in a secondary storage, copies the symbol database module 244A and the symbol module object 344A. Reverting VM 124 to the symbol context it had at time T1 would entail instantiating (in random-access memory) an instance of the symbol database module 244A from its saved copy, and instantiating (in random-access memory) an instance of the symbol module objects from its saved copy.

At time T2, software modules #1-2 of the first instance 126A of guest software 126 have been loaded, identified, or executed, software module #1 of the second instance 126B of guest software 124 has been loaded, identified, or executed, software module #3 of the first instance of guest software 126 has not been loaded, identified, or executed yet, and software modules #2-3 of the second instance of guest software 126 have not been loaded, identified, or executed yet.

At time T2, the symbol context of VM 124 includes symbol database modules 244A-B, symbol module objects 344A-B, and symbol module object 346A. Saving the symbol context of VM 124 at time T2 may entail saving, in a secondary storage, copies the symbol database modules 244A-B, symbol module objects 344A-B, and the symbol module object 346A. Reverting VM 124 to the symbol context it had at time T2 would entail instantiating (in random-access memory) each of the symbol database modules 244A-B, symbol module objects 344A-B, and the symbol module object 346A from their saved copies.

At time T3, software modules #1-3 of the first instance 126A of guest software 126 have been loaded, identified, or executed, software module #1 of the second instance 126B of guest software 126 has been loaded, identified, or executed, and software modules #2-3 of the second instance 126B of guest software 126 have not been loaded, identified, or executed yet.

At time T3, the symbol context of VM 124 includes symbol database modules 244A-C, symbol module objects 344A-C, and symbol module object 346A. Saving the symbol context of VM 124 at time T3 may entail saving, in a secondary storage, copies the symbol database modules 244A-C, symbol module objects 344A-C, and the symbol module object 346A. Reverting VM 124 to the symbol context it had at time T3 would entail instantiating (in random-access memory) each of the symbol database modules 244A-C, the symbol module objects 344A-C, and the symbol module object 346A from their saved copies.

It will be understood that the FIG. 3C provides only one example of a symbol context. In general, the term "symbol context" may refer to any information that is used by the symbol system 128 to resolve a symbol query. The symbol context of VM 124 may include a subset of this information. For example, the symbol context of VM 124 may include any information that is used by the symbol system 128 to resolve the addresses of symbols that are part of the symbol space of VM 124 and/or any software that is loaded, identified, or executed within VM 124. As another example, the symbol context of VM 124 may include all (or at least some) symbol module objects that are associated with VM 124 and/or software modules that are loaded, identified, or executed within VM 124. As yet another example, the symbol context of VM 124 may include all (or at least some) symbol database modules 244 that are referenced by symbol module objects associated with VM 124 and/or software modules that are loaded, identified, or executed within VM 124.

Those of ordinary skill in the art will readily recognize that the meaning of the term "context" can vary depending on the situation in which it is used. In this regard, it will be understood that the present disclosure does not intend to limit the meaning of the term "context" in any way. The discussion of the symbol context of VM 124 (with respect to FIG. 3C) is provided for illustrative purposes only, to show: (1) a non-limiting example of information (e.g., object portions) that might be stored when "the current symbol context of VM 124" is being saved, and (2) a non-limiting example of information (e.g., objects or object portions) that might be restored when VM 124 is reverted to a prior context.

The concept of "symbol space" is closely related to that of symbol context. In the examples presented up to this point, a symbol space has been described as a collection of symbol module objects. However, it will be understood that a "symbol space" may include any set of symbol definitions that are used by a particular entity (e.g., a software module, a software program, a virtual machine, etc.). As discussed above, a symbol space may be represented by symbol module objects that reference the definitions that are part of the symbol space. However, it will be understood that the present disclosure is not limited to any specific representation of symbol spaces. In some implementations, the symbol space of a program (or software module) may include all (or at least some) symbols that are defined by, or associated with, that program (or software module).

A symbol space of a program (or software module) may be part of the execution context of the program (or software module). If multiple instances of the program (or software module) are running, each may have its own symbol space—as represented by the set of symbol module objects that are associated with that instance. Moreover, under the nomenclature of the present disclosure, the symbol space of an entity may include the symbol space of all (or at least some) sub-entities that are encapsulated in the entity. For example, the symbol space of a virtual machine may include the symbol space(s) of all software module that form the virtual machine, as well as the symbol space(s) of all or at least some programs that are executed within the virtual machine. As another example, the symbol space of a program may include the symbol space(s) of all (or at least some) software modules that are part of the program.

The VM 124 may have a "current symbol space." When VM 124 is running, the current symbol space of VM 124 may be the symbol space of the VM at a present time instant (e.g., the symbol space of software that is being executed by VM 124). When VM 124 is suspended, the current symbol space of VM 124 may be the symbol space of a VM 124 when the VM was suspended (to make time for the debugger 122 to run on the processor 110). As illustrated in FIG. 3C, the symbol space of VM 124 may expand as its execution progresses. In some respects, the current symbol space of VM 124 may be the set (or subset) of symbol definitions that are being used by VM 124 (or any software running within VM 124) at the most recent moment in the operation of VM 124.

According to the example of FIG. 1A, the debugger 122 may be run outside of the context of VM 124, but within the context of VMM 120. The guest software 126 may run inside VM 124, and it may be executing in either kernel or user mode. The symbol system 128 may provide an interface for the debugger 122 to query the current symbol space of VM 124. Additionally or alternatively, the symbol system 128 may provide an interface for the debugger 122 to query any symbol space made available by the symbol context manager 146, irrespective of which symbol space describes the present state of VM 124 (i.e., irrespective of which symbol space is part the current symbol space of VM 124). The symbol system 128 uses the symbol context manager 146 to enable the debugger 122 to interrogate the symbol database 142 for a symbol associated with any symbol state of an instance of guest software or the symbol state of VM 124 itself. In other words, the symbol context manager 146 allows the debugger 146 to interrogate any portion of the symbol database 142. This is in contrast to conventional symbol systems, which may not be provided with a symbol context manager, and which may limit a debugger to interrogating only a specific portion of the symbol database 142 (e.g., only a portion of the symbol database 142 where the current symbol space of a VM, etc.)

The symbol context manager 146 may: (i) keep track of the current symbol context of VM 124, (ii) keep track of all loaded but inactive symbol contexts of VM 124, and (iii) identify any symbol context to the symbol manager 144 when the symbol manager 144 receives, from the debugger 122, a symbol query for a symbol that is defined in the symbol space of VM 124. As noted above, over the course of its operation, the debugger 122 may need to resolve symbols that exist within the current symbol space of VM 124. To do so, the debugger 122 may submit a symbol query to the symbol manager 144. Next, the symbol manager 144 may obtain, from the symbol context manager 146, an indication of the current symbol space of VM 124 or an indication of another (e.g., non-current) symbol space of VM 124 requested by debugger 122. And finally, the symbol manager 144 may resolve the symbol query by searching the symbol space of VM 124 provided by the symbol context manager 146.

Figure 4A:
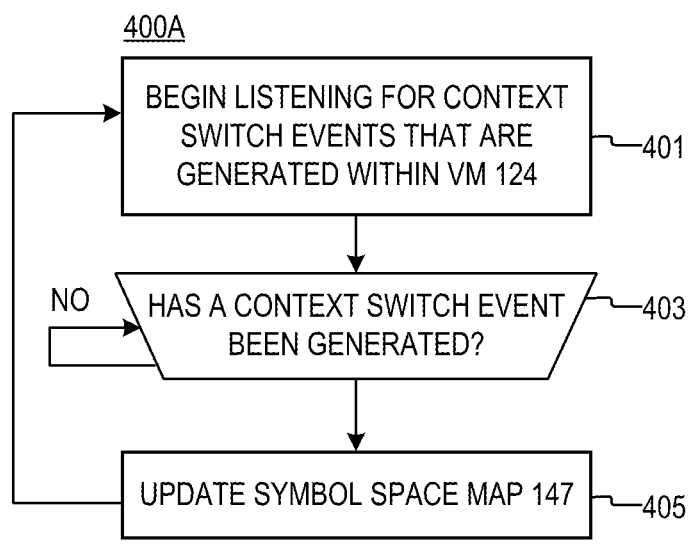
FIG. 4A is a flowchart of an example of a process, according to aspects of the disclosure.

FIG. 4A is a flowchart of an example of a process 400A, according to aspects of the disclosure. At step 401, the symbol context manager 146 beings listening for context switch events that are generated within VM 124. At step 403, the symbol context manager 146 detects whether a context switch event has been generated. If no context switch events have been generated, step 403 is repeated again. Otherwise, if a context switch event has been generated, the process 400A proceeds to step 405. A context switch event may include any event that is generated when VM 124 stops executing a first process (or thread) and begins executing a second process (or thread). By way of example, the first process (or thread) may be an instance of one software module and the second process (or thread) may be an instance of a second software module. At step 405, the symbol context manager 146 updates the symbol space map. Updating the symbol space map may include the symbol space map 147 to identify the symbol space of the second thread (or process) as the current symbol space of VM 124. Additionally or alternatively, if the second thread (or process) is being executed for the first time, i.e., if the second thread or process is being instantiated (as opposed to being resumed), updating the symbol space map 147 may include adding to the symbol space map 147 to include a new entry corresponding the symbol space of the second process (or thread). As discussed above, the new entry may identify the portion of the symbol database 142 where the symbol space of the second thread (or process) is stored. The identified portion may include only the definitions from the symbol space of the second process (or thread). Alternatively, the identified portion may include other definitions, in addition to those from the symbol space of the second process (or thread).

Figure 4B:
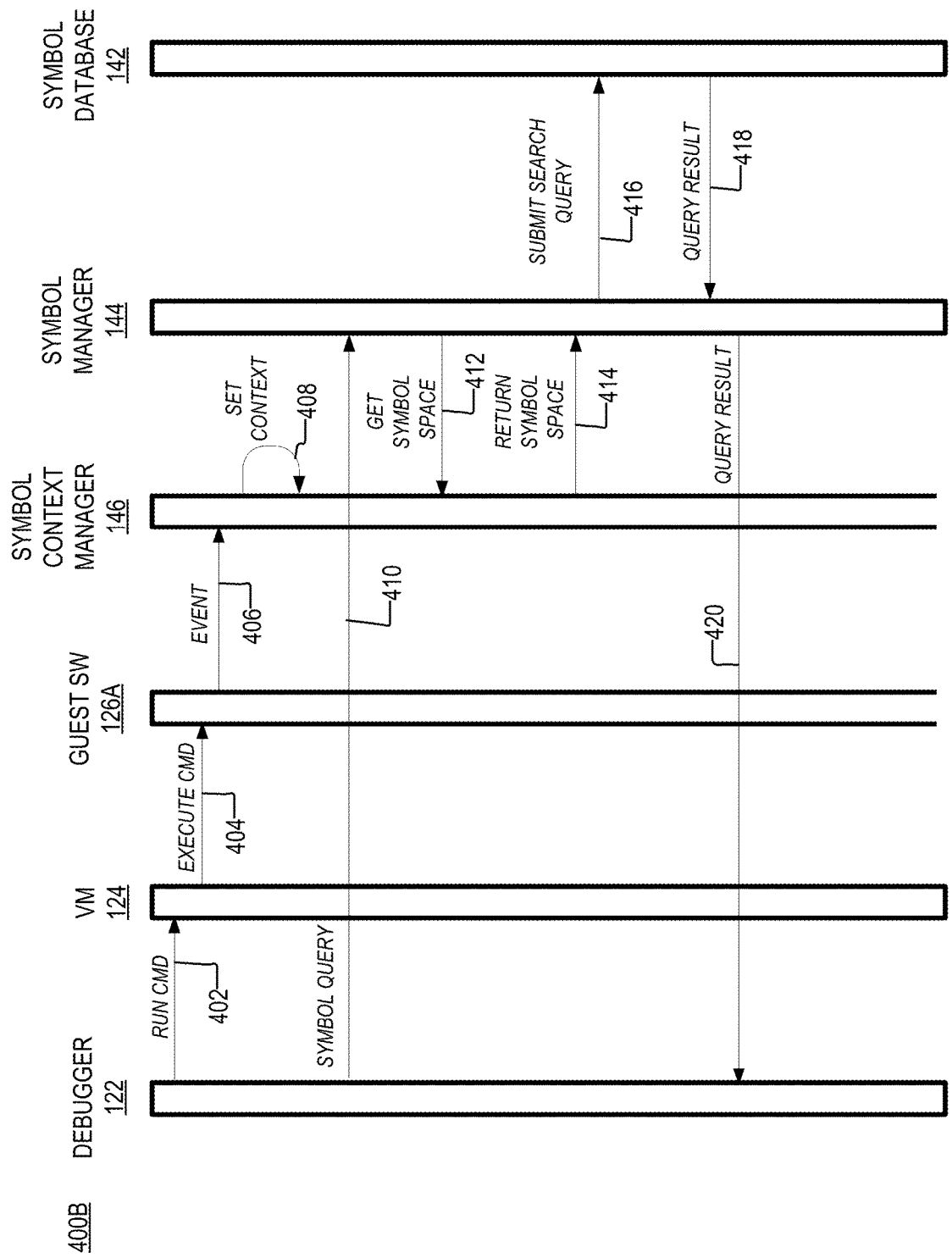
FIG. 4B is a flowchart of an example of a process, according to aspects of the disclosure.

FIG. 4B is a sequence diagram of a process 400B, according to aspects of the disclosure. At step 402, the debugger 122 instructs VM 124 to stop executing one software module of the first instance 126A of guest software 126 and begin executing another software module of the first instance 126A of the guest software 126. At step 404, VM 124 transmits to the first instance 126A of guest software 126 an instruction to execute the new software module. At step 406, VM 124 generates a context switch event, and begins executing or loading the new software module. At step 408, the symbol context manager 146 detects the context switch event and updates the symbol space map 147. In some implementations, the symbol space map 147 may be updated in the manner discussed above with respect to FIG. 4A. At step 410, the debugger 122 transmits a symbol query to the symbol manager 144. The symbol query may include a symbol that is desired to be resolved. The symbol may be part of the symbol space of the new software module. According to the present example, VM 124 is suspended in order for the debugger 122 to make the symbol query (i.e., because VM 124 and the debugger 122 are running on the same processor). At step 412, the symbol manager 144 transmits, to the symbol context manager 146, a request to identify the current symbol space of VM 124. At step 414, the symbol manager returns an indication of the current symbol space of VM 124. The indication may include a symbol space identifier or another value that is generated on based on information stored in the symbol space map 147. As noted above, the indication may identify (directly or indirectly) a portion of the symbol database 142 where the symbol from the symbol query is defined. At step 416, the symbol manager 144 transmits to the symbol database 142 a search query that is generated based on the indication received at step 414. The search query may instruct the symbol database 142 to search the portion of the symbol database (identified by the indication) for a symbol definition that matches the symbol from the symbol query. At step 418, the symbol database returns to the symbol manager 144 a result of the search query. At step 420, the symbol manager 144 forwards the result to debugger 122.

According to the example, of FIG. 4B, the symbol desired to be resolved is part of the current symbol space of VM 124 (e.g., the symbol space of a program instance and/or software module that was executing in VM 124 when VM 124 was suspended). However, alternative implementations are possible in which the symbol that is desired to be resolved of a non-current symbol space of VM 124 (e.g., the symbol space of a program instance or software module that was suspended, rather than running within VM 124, when VM 124 was suspended to give CPU time to the debugger 122 to make the symbol query). When the symbol is part of the current symbol space, the symbol context manager 146 may identify the portion of the symbol database 142, where the current symbol space is defined (or stored). When the symbol is part of a given non-current symbol space, the symbol context manager 146 may identify the portion of the symbol database 142, where the non-current symbol space is defined (or stored). As noted above, in some implementations, the symbol context manager 146 may use, at least in part, the symbol space map 147 to identify the portion of the symbol database 142 where the current or non-current symbol space is defined (or stored).

According to the example of FIG. 4B, the request transmitted at step 410 does not identify a symbol space, which the symbol that is desired to be resolved is part of. The lack of explicit identification implies that the symbol that is desired to be resolved is part of the current symbol space of VM 124. However, alternative implementations are possible in which the request includes an identifier that identifies the symbol space, which the symbol that is desired to be resolved is part of By way of example, the request may include a process ID of a software module that is associated with the symbol space and/or any other suitable type of symbol space identifier, etc.

Figure 5:
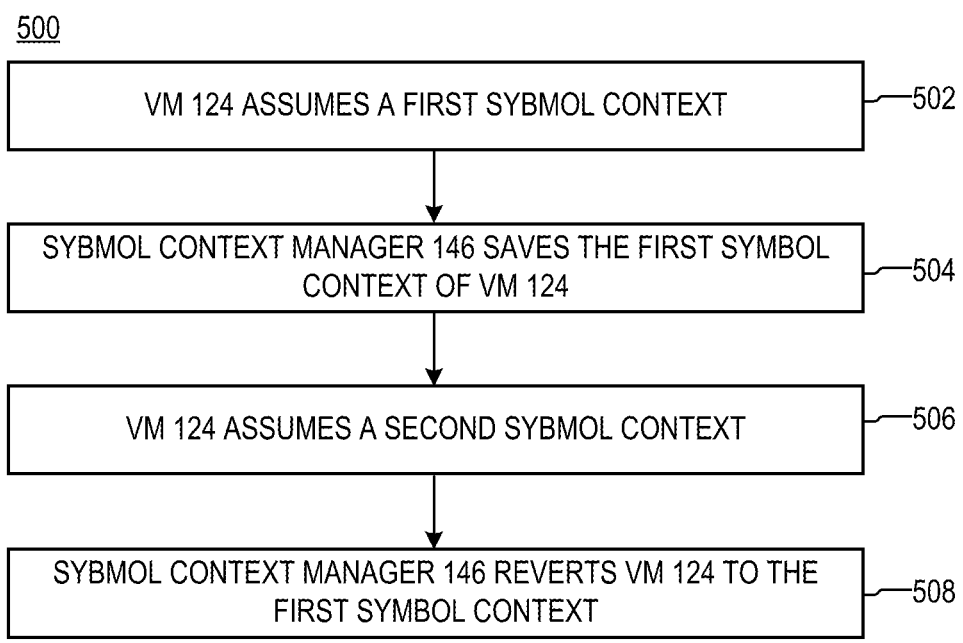
FIG. 5 is a flowchart of an example of a process, according to aspects of the disclosure.

FIG. 5 is a flowchart of an example of a process 500, according to aspects of the disclosure. At step 502, VM 124 assumes a first symbol context. At step 504, the symbol context manager 146 saves the first context to a secondary storage. At step 506, VM 124 assumes a second symbol context. At step 508, the symbol context manager 146 reverts VM 124 to the first symbol context.

In some implementations, saving the first context may include: (i) identifying each symbol database module 244 that is part of the first symbol context, creating a respective first copy of each of the identified symbol database modules 244, and storing the respective first copy in a secondary storage. Furthermore, in some implementations, saving the first symbol context may include: (i) identifying each symbol module object that is part of the symbol space 310, creating a respective second copy of each of the identified symbol module object, and storing the respective second copy in the secondary storage.

In some implementations, reverting VM 124 to the first symbol context may include, replacing an existing instance of the symbol database 142 with a new instance of the symbol database 142 that is generated based on the first copies. Additionally or alternatively, in some implementations, reverting VM 124 to the first symbol context may include, replacing an existing instance of the symbol space 310 with a new instance of the symbol space 310 that is generated based on the second copies.

It will be understood that the present disclosure is not limited to any specific method for generating copies of symbol database modules and symbol module objects. The copy of a symbol database module (or a symbol module object) may include a complete copy, a partial copy, an incremental copy, and or any other suitable type of copy that permits the current state of the symbol database module (or symbol module object) to be restored at a later point in time. Furthermore, it will be understood that the present disclosure is not limited to any specific implementation of the secondary storage where copies of symbol database modules and symbol module objects are stored. For example, in some implementations, the secondary storage may include a non-volatile memory, such as a hard drive, solid-state drive, a network accessible storage (NAS), etc. As another example, in some implementations, the secondary storage may include a file system directory. As yet another example, the secondary storage where the context of a virtual machine is stored may be located on the memory device from which the virtual machine is executed (e.g., random-access memory, nvRAM, etc.)

Figure 6A:
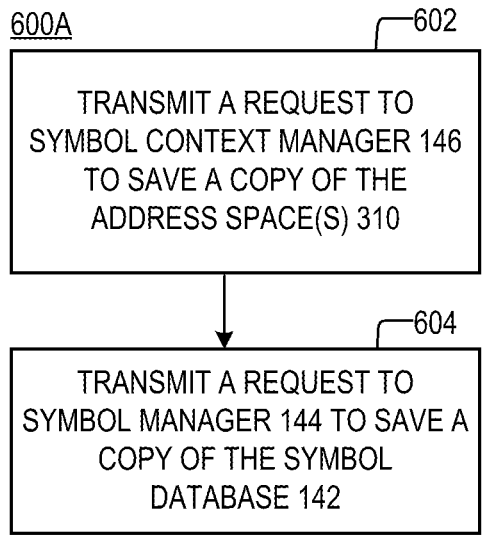
FIG. 6A is a flowchart of an example of a process, according to aspects of the disclosure.

FIGS. 6A-E show examples of processes for saving the current symbol context of VM 124. FIG. 6A is a flowchart of an example of a process 600A that is performed by VMM 120. FIG. 6A is a flowchart of an example of a process 600A for saving a current symbol context of VM 124. In the example of FIGS. 6A-E, the current symbol context of VM 124 is the context assumed by VM 124 at time T2 (See FIG. 3C). At step 602, VMM 120 transmits to symbol context manager 146 a request to save a copy of the symbol space 310 of VM 124. At step 604, VMM 120 transmits to the symbol manager 144 a request to save a copy of the symbol database 142.

Figure 6B:
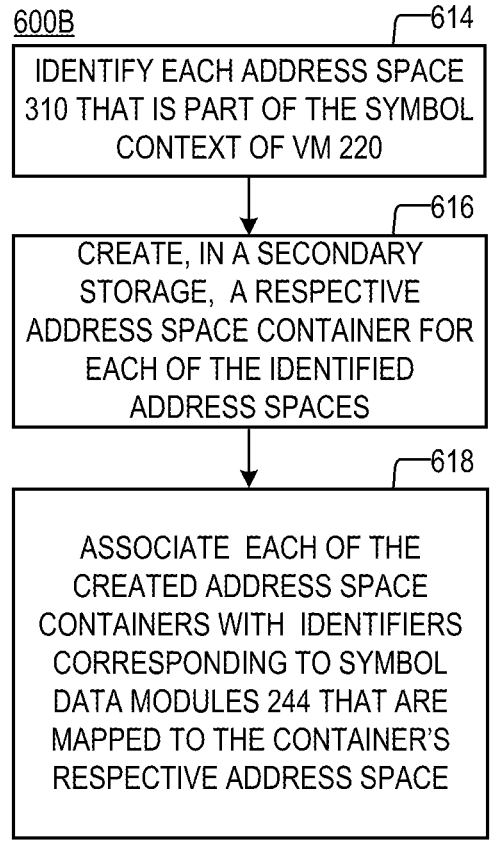
FIG. 6B is a flowchart of an example of a process, according to aspects of the disclosure.

FIG. 6B is a flowchart of an example of a process 600B that is executed in response to the request transmitted at step 602. At step 614, the symbol context manager 146 identifies each symbol space that is part of the symbol space 310 of VM 124. According to the present example, the symbol context manager 146 detects that symbol space 310 includes the symbol space 310A and the symbol space 310B. At step 616, the symbol context manager 146 creates, in a secondary storage, a respective symbol space record for each of the symbol spaces that are identified at step 614. According to the present example, the symbol context manager 146 creates a symbol space record 640 and a symbol space record 642, both of which are shown in FIG. 6E. According to the present example, the symbol space record 640 corresponds to the symbol space 310A and the symbol space record 642 corresponds to the symbol space 310B. At step 618, the symbol context manager associates each of the created symbol space records with identifiers corresponding to the symbol database modules 244 that are associated with the record's corresponding symbol space. As illustrated in FIG. 6E, the symbol context manager 146 may insert in the symbol space record 640 a list of symbol database modules that are associated with symbol space 310A. Furthermore, the symbol context manager 146 may insert in the symbol space record 640B a list of symbol database modules that are associated with symbol space 310B. According to the present example, a symbol database module is associated with a symbol space if the symbol database module is referenced by a symbol module object that is part of the symbol space.

In some implementations, step 618 may be performed by executing a process 600C (shown in FIG. 6C) for each of the symbol space records.

Figure 6C:
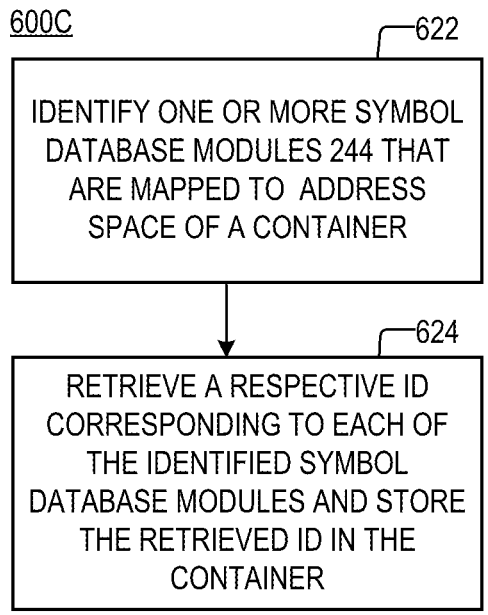
FIG. 6C is a flowchart of an example of a process, according to aspects of the disclosure.

FIG. 6C is a flowchart of an example of a process 600C for associating symbol space records with identifiers of associated symbol database modules 244. At step 622, the symbol context manager 146 identifies one or more symbol database modules 244 that are associated with the symbol space 310 that corresponds to a symbol space record. At step 624, the symbol context manager 146 retrieves a respective ID of each of the symbol database modules 244 (identified at step 622) and copies the retrieved ID into the symbol space record. In some implementations, the symbol context manager may retrieve the ID of any of the symbol database modules 244 by transmitting a request for the ID to the symbol manager 144. The symbol context manager 146 may forward the request to the symbol database 142. The symbol database 142 may return the ID to the symbol manager 144. And the symbol manager 144 may provide the ID to the symbol context manager.

Figure 6D:
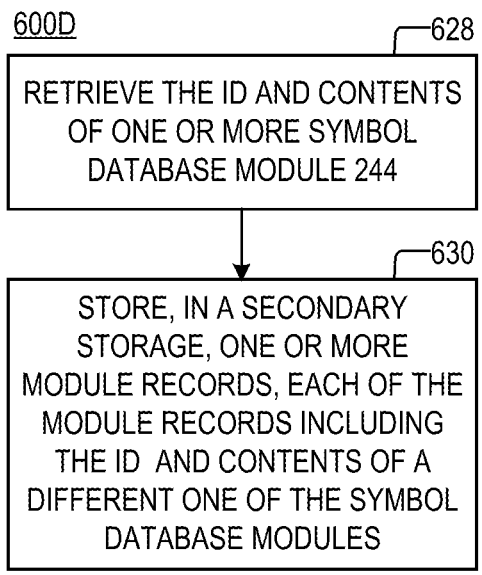
FIG. 6D is a flowchart of an example of a process, according to aspects of the disclosure.
Figure 6E:
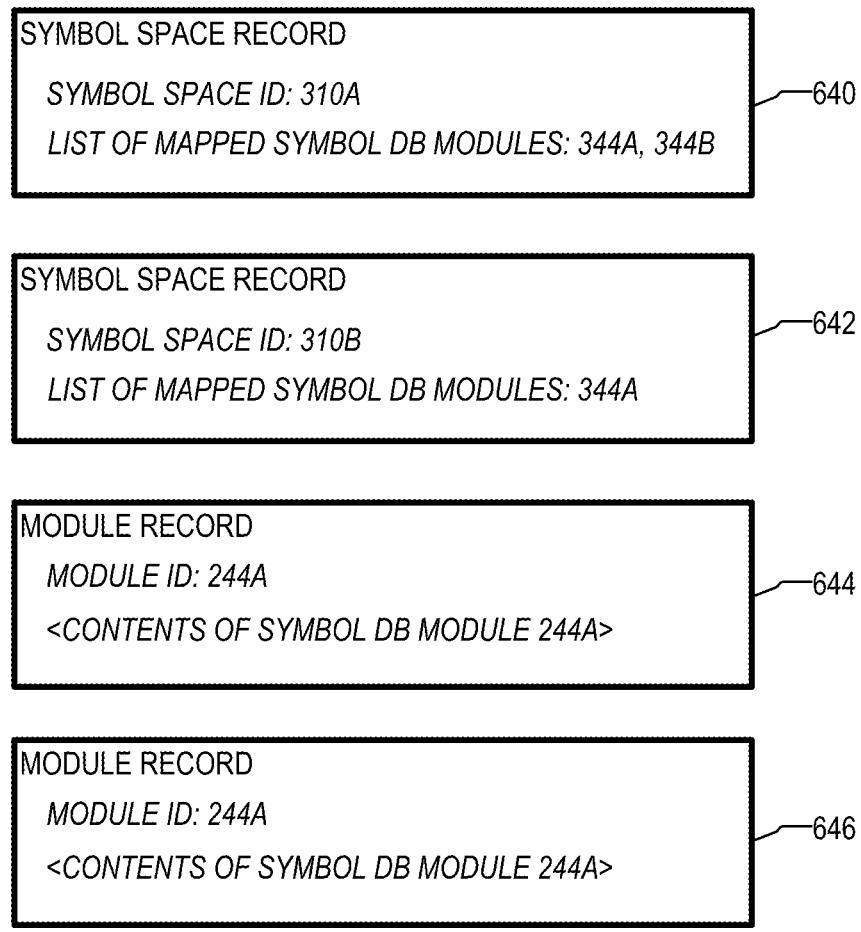
FIG. 6E is a diagram illustrating examples of address space records and module records, according to aspects of the disclosure.

FIG. 6D is a flowchart of an example of a process 600D that is executed in response to the request transmitted at step 604. At step 628, the symbol manager 144 retrieves, from the symbol database 142, the ID and contents of each symbol database module 244 that is part of the symbol database 142. At step 630, the symbol manager 144 stores in the secondary storage one or more module records, wherein each of the module records includes the ID and contents of a different one of the symbol database modules whose IDs and contents are retrieved at step 628. According to the present example, the symbol manager 144 stores, in the secondary storage, module records 644 and 646, both of which are shown in FIG. 6E. As illustrated in FIG. 6E, module record 644 includes the ID and contents of symbol database module 244A and module record 646 includes the ID and contents of symbol database module 244B.

Figure 7A:
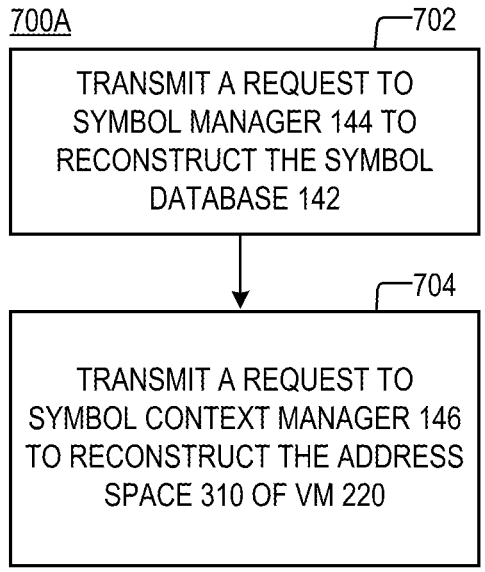
FIG. 7A is a flowchart of an example of a process, according to aspects of the disclosure.

FIGS. 7A-D show examples of processes for reverting the virtual machine to a prior symbol context. FIG. 7A is a flowchart of an example of a process 700A that is performed by VMM 120. At step 702, VMM 120 transmits to symbol manager 144 a request to reconstruct the symbol database 142. At step 704, VMM 120 transmits to symbol context manager 146 a request to reconstruct the symbol space 310 of VM 124.

Figure 7B:
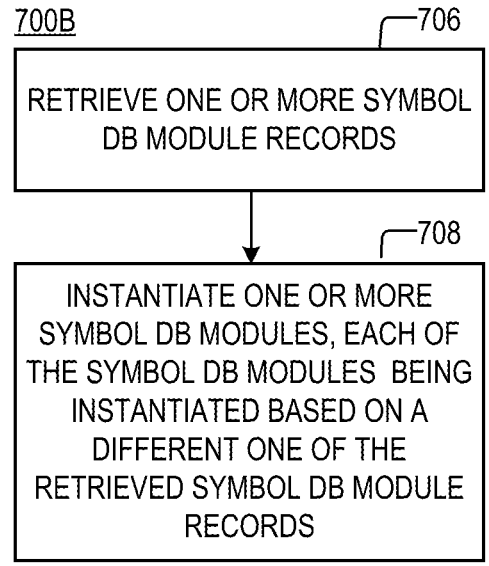
FIG. 7B is a flowchart of an example of a process, according to aspects of the disclosure.

FIG. 7B is an example of a process 700B that is performed by the symbol manager 144 in response to the request transmitted at step 702. At step 706, the symbol database manager retrieves from the secondary storage one or more module records. At step 708, the symbol database manger instantiates one or more symbol database modules 244 by using the retrieved records. Each of the symbol database modules is generated based on a different one of the module records, and thus includes the id and contents of that module record. In some implementations, the instantiation of the symbol database modules may result in a new instance of the symbol database 142 being created, which is subsequently used to replace an existing instance of the symbol database 142.

Figure 7C:
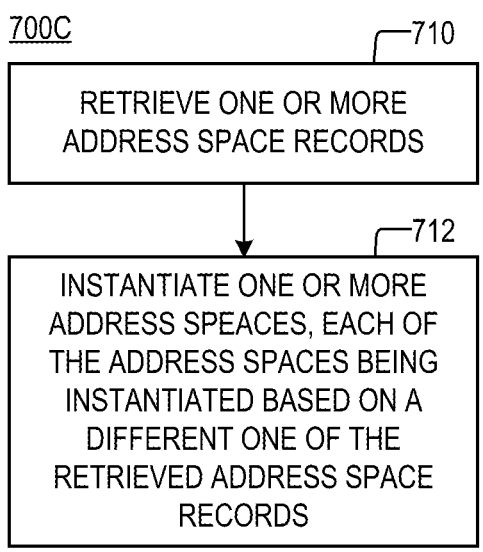
FIG. 7C is a flowchart of an example of a process, according to aspects of the disclosure.

FIG. 7C is a flowchart of an example of a process 700C that is performed by symbol context manager 146 in response to the request transmitted at step 704. At step 710, the symbol context manager 146 retrieves one or more symbol space records that are associated with VM 124. At step 712, the symbol context manager 146 instantiates one or more symbol spaces. Each of the symbol spaces may be instantiated based on a different one of the retrieved one or more symbol space records. Each of the symbol spaces 310 may be instantiated by executing a process 700D, which is discussed further below with respect to FIG. 7D.

Figure 7D:
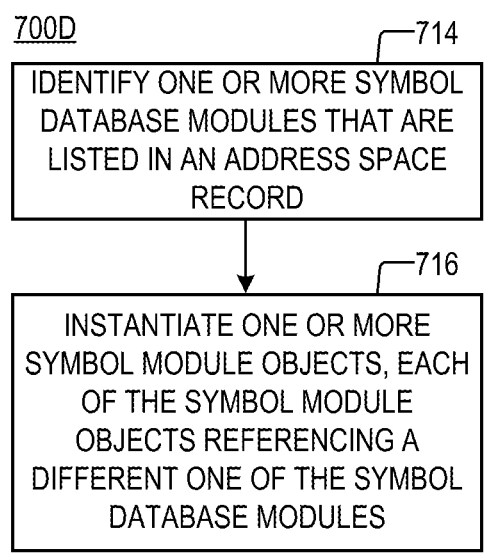
FIG. 7D is a flowchart of an example of a process, according to aspects of the disclosure.

FIG. 7D is a flowchart of an example of a process 700D for instantiating a symbol space based on a symbol space record. At step 714, the symbol context manager 146 identifies one or more symbol database modules that are listed in the symbol space record. At step 716, the symbol context manager 146 instantiates one or more symbol module objects. Each of the symbol module objects may be arranged to reference a different one of the symbol database modules that are listed in the symbol space record. In some implementations, the symbol context manager 146 may instantiate each of the symbol module object by transmitting, to the symbol manager 144, a request for the symbol module object. The request may include an identifier of the symbol database module that is associated with the symbol module object. In response to the request, the symbol manager 144 may generate the symbol module object and return the generated symbol module object to the symbol context manager 146.

FIGS. 1A-7D are provided as an example only. At least some of the steps discussed with respect to FIGS. 1A-7D may be performed in parallel, in a different order, or altogether omitted. As used in this application, the word "exemplary" is used herein to mean serving as an example, instance, or illustration.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method implemented by a computer processor executing computer software that causes the processor to perform steps comprising of:
   executing debugging software on a computerized system that operates a virtual machine;
   monitoring, by symbol context manager software operated by the processor, context switch events that are generated in the virtual machine, and updating a symbol space map based on the context switch events;
   receiving, by the symbol context manager, a request to provide a symbol space of the virtual machine, the request being generated by a symbol database interface in response to a symbol query that is received at the symbol database interface from the debugging software that is debugging the virtual machine, the symbol query being associated with a symbol that is part of the symbol space;
   providing, by the symbol context manager, an indication of the symbol space of the virtual machine, the indication of the symbol space being provided based on the symbol space map;
   receiving, by the symbol context manager, an instruction to revert the virtual machine to a prior symbol context; and
   in response to the instruction: (i) reconstructing a plurality of symbol database modules based on respective copies of the symbol database modules that are associated with the prior symbol context, and (ii) reconstructing a plurality of symbol module objects that reference the plurality of symbol database modules, the plurality of symbol module objects being reconstructed based on respective copies of the symbol module objects that are associated with the prior symbol context.

2. The method of claim 1, further comprising resolving, by the symbol database interface, the symbol query based on the indication of the current symbol space.

3. The method of claim 1, wherein the debugger is executed outside of the virtual machine.

4. The method of claim 1, further comprising:
   receiving, by the symbol context manager, an instruction to save a current symbol context of the virtual machine; and
   in response to the instruction: (i) storing, in a secondary storage, a respective copy of each of a plurality of symbol module objects that are associated with the virtual machine, and (ii) storing, in the secondary storage, a respective copy of each of a plurality of database modules that are referenced by the symbol module objects.

5. The method of claim 4, wherein the instruction is received from a virtual machine manager that is executing the virtual machine, the debugger, and the symbol context manager.

6. The method of claim 1, wherein each of the plurality of symbol module objects is arranged to reference a different one of the symbol database modules.

7. A system, comprising:
   a memory; and
   at least one processor operatively coupled to the memory, the at least one processor being configured to perform the operations of:
   executing debugging software on a computerized system that operates a virtual machine;
   monitoring, by a symbol context manager, context switch events that are generated: in the virtual machine, and updating a symbol space map based on the context switch events;
   receiving, by the symbol context manager, a request to provide a symbol space of the virtual machine, the request being generated by a symbol database interface in response to a symbol query that is received at the symbol database interface from the debugging software that is debugging the virtual machine, the symbol query being associated with a symbol that is part of the symbol space;
   providing, by the symbol context manager, an indication of the symbol space of the virtual machine, the indication of the symbol space being provided based on the symbol space map
   receiving, by the symbol context manager, an instruction to revert the virtual machine to a prior symbol context; and
   in response to the instruction: (i) reconstructing a plurality of symbol database modules based on respective copies of the symbol database modules that are associated with the prior symbol context, and (ii) reconstructing a plurality of symbol module objects that reference the plurality of symbol database modules, the plurality of symbol module objects being reconstructed based on respective copies of the symbol module objects that are associated with the prior symbol context.

8. The system of claim 7, wherein the at least one processor is further configured to perform the operation of resolving, by the symbol database interface, the symbol query based on the indication of the current symbol space.

9. The system of claim 7, wherein the debugger is executed outside of the virtual machine.

10. The system of claim 7, wherein the at least one processor is further configured to perform the operations of:
    receiving, by the symbol context manager, an instruction to save a current symbol context of the virtual machine; and
    in response to the instruction: (i) storing, in a secondary storage, a respective copy of each of a plurality of symbol module objects that are associated with the virtual machine, and (ii) storing, in the secondary storage, a respective copy of each of a plurality of database modules that are referenced by the symbol module objects.

11. The system of claim 10, wherein the instruction is received from a virtual machine manager that is executing the virtual machine, the debugger, and the symbol context manager.

12. The system of claim 7, wherein each of the plurality of symbol module objects is arranged to reference a different one of the symbol database modules.

13. A non-transitory computer-readable medium storing one or more processor-executable instructions, which when executed by at least one or processor cause the processor to perform the operations of:
    executing debugging software on a computerized system that operates a virtual machine;
    monitoring, by a symbol context manager software operated by the processor, context switch events that are generated in the virtual machine, and updating a symbol space map based on the context switch events;
    receiving, by the symbol context manager, a request to provide a symbol space of the virtual machine, the request being generated by a symbol database interface in response to a symbol query that is received at the symbol database interface from the debugging software that is debugging the virtual machine, the symbol query being associated with a symbol that is part of the symbol space;

providing, by the symbol context manager, an indication of the symbol space of the virtual machine, the indication of the current symbol space being provided based on the symbol space map;

receiving, by the symbol context manager, an instruction to revert the virtual machine to a prior symbol context; and in response to the instruction: (i) reconstructing a plurality of symbol database modules based on respective copies of the symbol database modules that are associated with the prior symbol context, and (ii) reconstructing a plurality of symbol module objects that reference the plurality of symbol database modules, the plurality of symbol module objects being reconstructed based on respective copies of the symbol module objects that are associated with the prior symbol context.

14. The non-transitory computer-readable medium of claim 13, wherein the one or more processor-executable instructions further cause the at least one processor to perform the operation of resolving, by the symbol database interface, the symbol query based on the indication of the current symbol space.

15. The non-transitory computer-readable medium of claim 13, wherein the debugger is executed outside of the virtual machine.

16. The non-transitory computer-readable medium of claim 13, wherein the one or more processor-executable instructions further cause the at least one processor to perform the operations of:

receiving, by the symbol context manager, an instruction to save a current symbol context of the virtual machine; and in response to the instruction: (i) storing, in a secondary storage, a respective copy of each of a plurality of symbol module objects that are associated with the virtual machine, and (ii) storing, in the secondary storage, a respective copy of each of a plurality of database modules that are referenced by the symbol module objects.

17. The non-transitory computer-readable medium of claim 13, wherein the instruction is received from a virtual machine manager that is executing the virtual machine, the debugger, and the symbol context manager.

* * * * *